(12) United States Patent
Veilleux, Jr. et al.

(10) Patent No.: US 10,941,767 B2
(45) Date of Patent: Mar. 9, 2021

(54) HYBRID PUMP BEARING FOR CONTAMINATION RESISTANCE

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US); James S. Elder, South Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 302 days.

(21) Appl. No.: 15/939,813

(22) Filed: Mar. 29, 2018

(65) Prior Publication Data

US 2019/0301451 A1 Oct. 3, 2019

(51) Int. Cl.
*F03C 2/00* (2006.01)
*F03C 4/00* (2006.01)
(Continued)

(52) U.S. Cl.
CPC .............. *F04C 2/086* (2013.01); *F01C 21/02* (2013.01); *F04C 2/14* (2013.01); *F16C 17/10* (2013.01);
(Continued)

(58) Field of Classification Search
CPC ...... F04C 2/088; F04C 2/18; F04C 2210/203; F04C 2230/20; F04C 2230/91;
(Continued)

(56) References Cited

U.S. PATENT DOCUMENTS

2004/0264820 A1* 12/2004 Tsuji ....................... F16C 33/14
384/276
2013/0319153 A1* 12/2013 Ni ............................. F04C 2/14
418/206.5
(Continued)

FOREIGN PATENT DOCUMENTS

DE 102004030017 A1 2/2005
EP 1722103 A2 11/2006
(Continued)

OTHER PUBLICATIONS

The Extended European Search Report for Application No. 19165210.6-1013; Report dated Aug. 13, 2019; Report Received Date: Aug. 19, 2019; 11 pages.

*Primary Examiner* — Theresa Trieu
(74) *Attorney, Agent, or Firm* — Cantor Colburn LLP

(57) ABSTRACT

A bearing carrier is provided. The bearing carrier including: a bearing body of a first material having a shaft-receiving aperture and a bridge land with a finger cut to channel fluid pressurized by intermeshing of gears rotatably supported by the bearing carrier into an outlet defined by a housing enveloping the bearing carrier, wherein the bearing body includes a bearing face configured to be in a facing spaced relationship with the gears, wherein the bearing face includes a second material integral with the first material, wherein at least one of the first material and the second material define a portion of the bearing face of the bearing body extending about the shaft-receiving aperture, the portion of the bearing face excluding the bridgeland.

19 Claims, 8 Drawing Sheets

(51) Int. Cl.
| | |
|---|---|
| *F04C 18/00* | (2006.01) |
| *F04C 2/00* | (2006.01) |
| *F04C 2/08* | (2006.01) |
| *F04C 2/14* | (2006.01) |
| *F16C 17/24* | (2006.01) |
| *F01C 21/02* | (2006.01) |
| *F16C 17/10* | (2006.01) |
| *F16C 33/24* | (2006.01) |
| *F16C 33/14* | (2006.01) |
| *F02C 7/22* | (2006.01) |
| *F16C 33/12* | (2006.01) |

(52) U.S. Cl.
CPC ............ *F16C 17/246* (2013.01); *F16C 33/14* (2013.01); *F16C 33/24* (2013.01); *F02C 7/22* (2013.01); *F04C 2210/203* (2013.01); *F04C 2230/20* (2013.01); *F04C 2240/30* (2013.01); *F04C 2240/50* (2013.01); *F04C 2240/56* (2013.01); *F05C 2251/02* (2013.01); *F05C 2251/046* (2013.01); *F05D 2220/323* (2013.01); *F16C 33/121* (2013.01); *F16C 2202/06* (2013.01); *F16C 2202/08* (2013.01); *F16C 2202/22* (2013.01); *F16C 2204/10* (2013.01); *F16C 2220/24* (2013.01); *F16C 2226/30* (2013.01); *F16C 2237/00* (2013.01); *F16C 2360/00* (2013.01); *F16C 2360/44* (2013.01)

(58) Field of Classification Search
CPC .............. F04C 2240/30; F04C 2240/50; F04C 2240/56; F01C 21/02; F16C 17/04; F16C 17/10; F16C 17/246; F16C 33/14; F16C 33/24; F16C 33/121; F16C 35/02; F16C 2202/06; F16C 2202/08; F16C 2202/22; F16C 2204/10; F16C 2220/24; F16C 2226/30; F16C 2237/00; F16C 2360/00; F16C 2360/43; F05C 2201/0412; F05C 2201/0448; F05C 2201/0475; F05C 2201/0484; F05C 2251/02; F05C 2251/046

See application file for complete search history.

(56) References Cited

U.S. PATENT DOCUMENTS

| | | | |
|---|---|---|---|
| 2015/0055909 A1* | 2/2015 | Loke ...................... | F16C 33/14 384/625 |
| 2016/0208611 A1 | 7/2016 | Veilleux, Jr. et al. | |
| 2018/0142685 A1* | 5/2018 | Veilleux, Jr. ............ | F16C 33/14 29/888.02 |
| 2018/0372091 A1* | 12/2018 | Elder ..................... | F04C 2/088 418/189 |

FOREIGN PATENT DOCUMENTS

| | | |
|---|---|---|
| EP | 3453903 A1 | 3/2019 |
| WO | 2017198253 A1 | 11/2017 |

\* cited by examiner

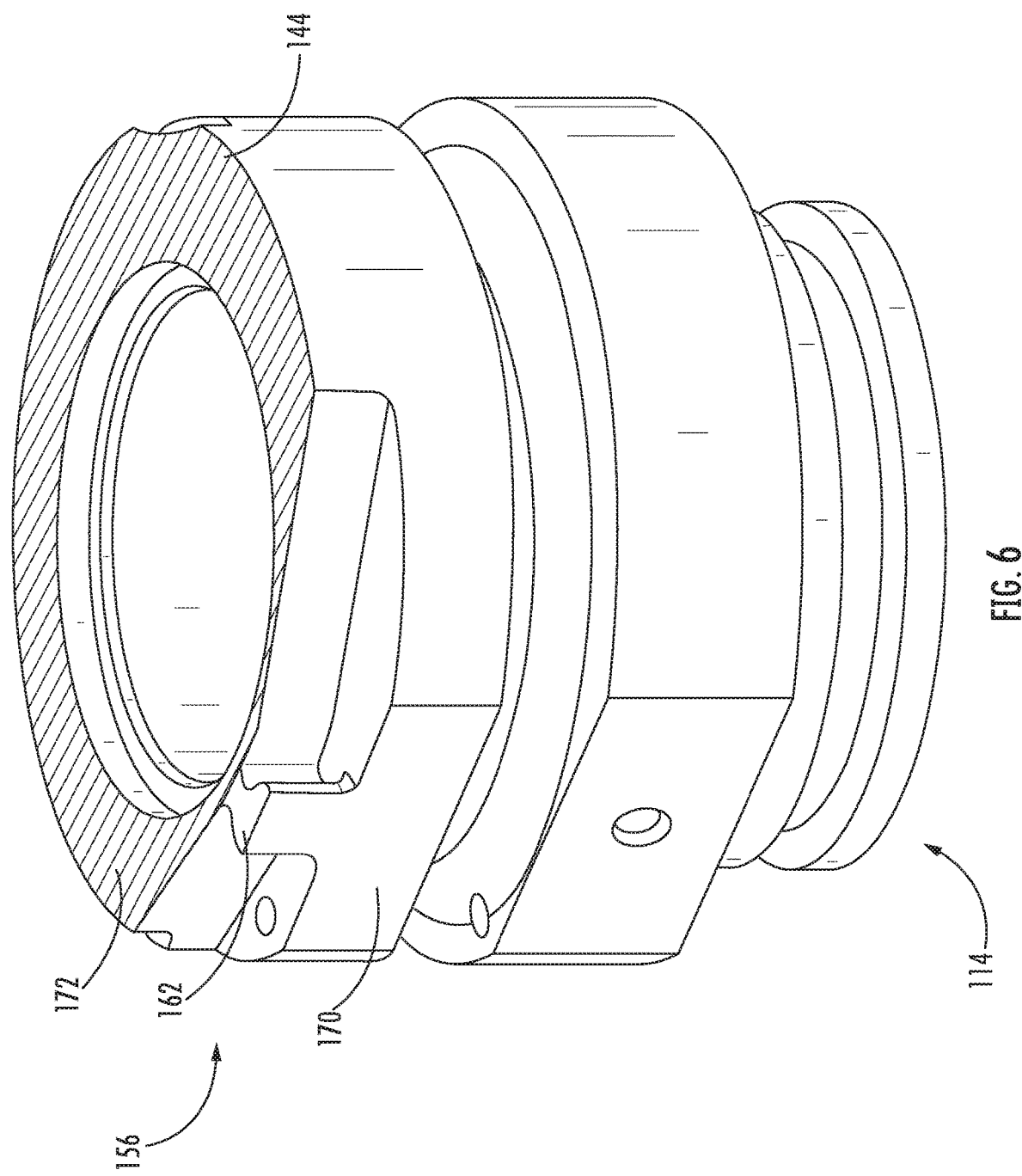

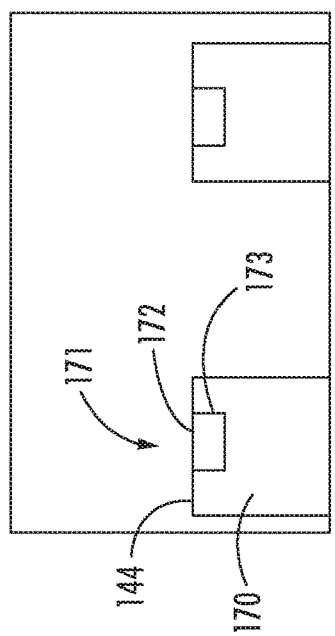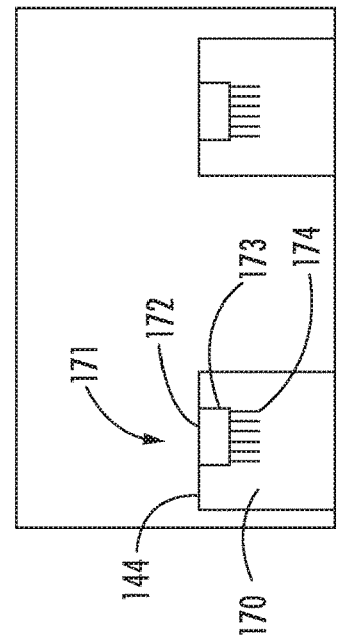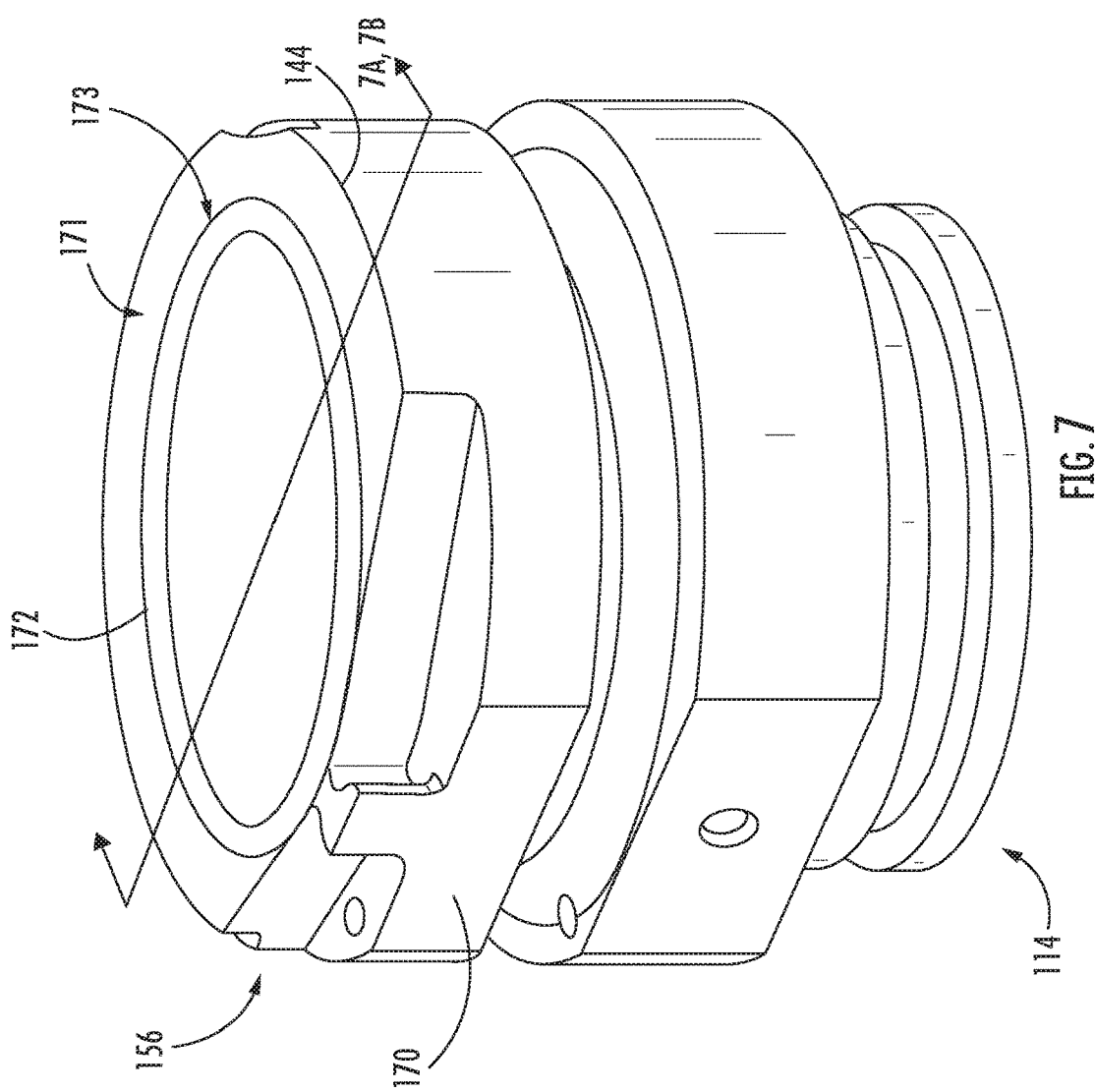

HYBRID PUMP BEARING FOR CONTAMINATION RESISTANCE

BACKGROUND

The subject matter disclosed herein generally relates to the field of gear pumps, and more particularly to an apparatus and method for manufacture and repair of gear pumps.

Gear pumps are commonly used to pump and pressurize fluid in fluid distribution systems. Gas turbine engines, such as gas turbine engines for aircraft main engines or auxiliary power units, typically use gear pumps to provide fuel flow and pressure to gas turbine engines and other aircraft systems. Such gear pumps generally operate over a relatively large rotational speed operating range to provide critical fuel flow and pressures for various functions. One example of a fuel gear pump is a dual stage pump including a drive gear and a driven gear. The drive gear is typically fixed to a drive shaft, which receives rotational power from an accessory gearbox. The driven gear is generally intermeshed with the drive gear such that the teeth of the drive gear intermesh with the teeth of the driven.

Each stage of the gear pump is disposed within a housing with an inlet and outlet and is supported by bearings with a bearing face. The bearing face provides a contour that receives pressurized fuel from the intermeshed gears and directs the pressurize fuel to the housing outlet.

BRIEF SUMMARY

According to one embodiment, a bearing carrier is provided. The bearing carrier including: a bearing body of a first material having a shaft-receiving aperture and a bridge land with a finger cut to channel fluid pressurized by intermeshing of gears rotatably supported by the bearing carrier into an outlet defined by a housing enveloping the bearing carrier, the bearing body includes a bearing face configured to be in a facing spaced relationship with the gears, the bearing face includes a second material integral with the first material, at least one of the first material and the second material define a portion of the bearing face of the bearing body extending about the shaft-receiving aperture, the portion of the bearing face excluding the bridgeland.

In addition to one or more of the features described above, or as an alternative, further embodiments may include that the bearing face includes a wear groove and the second material is located within the wear groove.

In addition to one or more of the features described above, or as an alternative, further embodiments may include that the second material is formed through at least one of laser cladding and advanced additive manufacturing.

In addition to one or more of the features described above, or as an alternative, further embodiments may include that the second material located within the wear groove is formed outside of the wear groove and then secured within the wear groove.

In addition to one or more of the features described above, or as an alternative, further embodiments may include that the second material further includes one or more dowel pins projecting outward from the second material and into the first material of the bearing body.

In addition to one or more of the features described above, or as an alternative, further embodiments may include that the one or more dowel pins are composed of the second material.

In addition to one or more of the features described above, or as an alternative, further embodiments may include that the one or more dowel pins are composed of a material different from the second material.

In addition to one or more of the features described above, or as an alternative, further embodiments may include that the first material is different from the second material.

In addition to one or more of the features described above, or as an alternative, further embodiments may include that the second material has a greater ultimate stress than an ultimate stress of the first material.

In addition to one or more of the features described above, or as an alternative, further embodiments may include that the second material has a greater yield stress than a yield stress of the first material.

In addition to one or more of the features described above, or as an alternative, further embodiments may include that the second material has a thermal coefficient of expansion that is less than a thermal coefficient of expansion of the first material.

In addition to one or more of the features described above, or as an alternative, further embodiments may include that the second material is press fit into the first material.

In addition to one or more of the features described above, or as an alternative, further embodiments may include that the second material has a melting point that is greater than a melting point of the first material.

In addition to one or more of the features described above, or as an alternative, further embodiments may include that a density of the second material is less than a density of the first material.

In addition to one or more of the features described above, or as an alternative, further embodiments may include that a galvanic potential of the second material is similar to a galvanic potential of the first material.

In addition to one or more of the features described above, or as an alternative, further embodiments may include that the first material includes a copper alloy and the second material includes monel, nickel, steel, or titanium.

In addition to one or more of the features described above, or as an alternative, further embodiments may include that the second material is cladded to the first material.

According to another embodiment, a pump is provided. The pump including: a bearing body of a first material having a shaft-receiving aperture and a bridge land with a finger cut to channel fluid pressurized by intermeshing of gears rotatably supported by the bearing carrier into an outlet defined by a housing enveloping the bearing carrier, the bearing body includes a bearing face in a facing spaced relationship with the gears, the bearing face includes a second material integral with the first material, at least one of the first material and the second material define a portion of the bearing face of the bearing body extending about the shaft-receiving aperture, the portion of the bearing face excluding the bridgeland, and the shaft-receiving aperture is a first shaft-receiving aperture and the bearing carrier defines a second shaft-receiving aperture; a first shaft rotatably supported in the first shaft-receiving aperture; a second shaft parallel with the first shaft and seated in the second shaft-receiving aperture; a first gear mounted to the first shaft; and a second gear mounted to the second shaft and intermeshed with the first gear, the bridge land of the bearing body faces the intermeshed gears such that intermeshing of the gears pressurizes and drives fluid across the bridge land and across channels defined in an exterior surface of the bearing carrier.

According to another embodiment, a method of fabricating a bearing carrier having a bearing body composed of a first material, the bearing body including a bearing face, a shaft-receiving aperture, and a bridge land with a finger cut to channel fluid pressurized by intermeshing of gears rotatably supported by the bearing carrier into an outlet defined by a housing enveloping the bearing carrier, the method includes: coupling a second material to the portion of the bearing face of the bearing body, the portion of the bearing face of the bearing body extending about the shaft-receiving aperture, the portion of the bearing face excludes the bridgeland; and defining the portion of the bearing face of the bearing body to a near-net shape of the bearing face.

In addition to one or more of the features described above, or as an alternative, further embodiments may include that the second material is coupled to the first material using at least one of a laser cladding process and an advanced additive manufacturing process.

Technical effects of embodiments of the present disclosure include forming an insert to fill a wear groove within a face of bearing of a gear pump.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 6 is a perspective view of a portion of the bearing carrier of the gear pump of FIG. 1, showing a first material, a second material, and the bearing face defined in the second material, according to an embodiment of the present disclosure;

FIG. 7 is a perspective view of a portion of the bearing carrier of the gear pump of FIG. 1, showing a first material, a second material, and a sleeve insert formed from the second material located in a wear groove on bearing face of the bearing carrier, according to an embodiment of the present disclosure;

FIG. 7A is a cross-sectional view of the sleeve insert of FIG. 7, according to an embodiment of the present disclosure;

FIG. 7B is a cross-sectional view of the sleeve insert of FIG. 7, according to an embodiment of the present disclosure.

DETAILED DESCRIPTION

A detailed description of one or more embodiments of the disclosed apparatus and method are presented herein by way of exemplification and not limitation with reference to the Figures.

The above described conventional methods and systems have generally been considered satisfactory for their intended purpose. However, as shown herein, there is a need in the art for improved gear pumps and methods of reconditioning the bearing faces of such gear pumps.

Various embodiments of the present disclosure are related to the prevention of wear with new bearings and or the repair of wear grooves within gear pumps. Aircraft engine high pressure fuel pumps typically use a pair of involute gears to generate fuel pressure for the burner injectors. These gears are enclosed in a housing within which they are supported by bearings. In the vicinity of the gear meshing region these bearings form a bridgeland that separates the high and low pressure regions and maintains high pump efficiency. The gears of the gear pump are in a facing-spaced relationship with the bearings of the gear pump. The facing-spaced relationship may be minute or small enough to prevent fuel through the space between the gears and the bearings. It has been discovered that debris within the fuel may become lodged in between the gears and the bearings, subsequently etching a wear groove (See wear groove 173 in FIGS. 7, 7A, and 7B) into a face of the bearing that abuts the gear. Wear grooves in the face of the bearings may result in a deterioration of pump performance and can significantly reduce the useable life of these components. Embodiments disclosed herein seek to address a method of manufacture or repair of bearings to prevent or correct the wear grooves in the face of the bearing.

Figure 1:
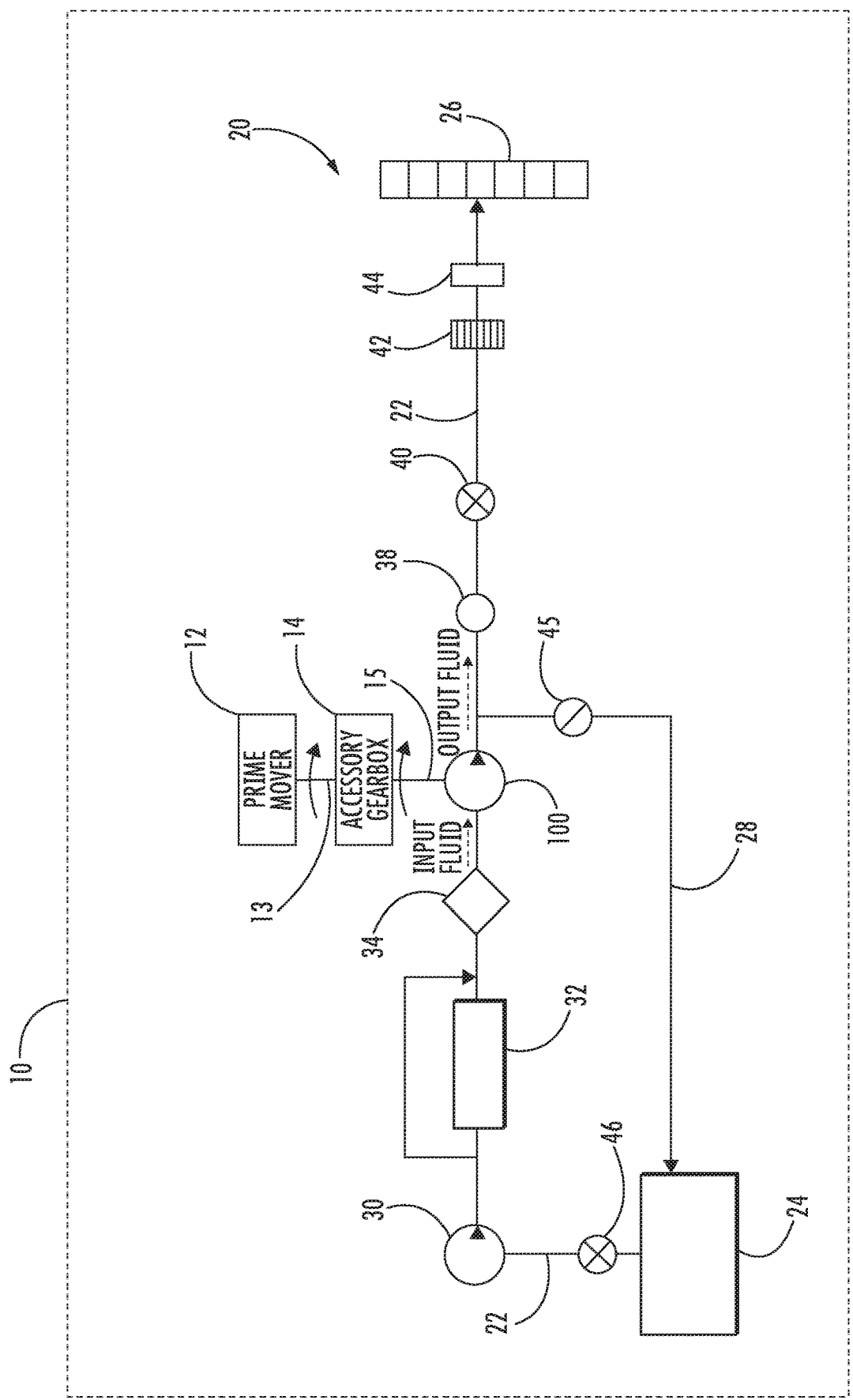
FIG. 1 illustrates a schematic of an aircraft fuel system as one, non-limiting, example of an application of a gear pump of the present disclosure.

Referring to FIG. 1, one embodiment of a gear pump 100 within an aircraft 10 of the present disclosure is illustrated. The gear pump 100 is operatively associated with a prime mover 12 of an aircraft 10 for pumping fluid through a fluid distribution system (e.g., fuel system 20) incorporated within the aircraft 10. The prime mover 12 may be a gas turbine engine, such as an aircraft main engine, and is operatively associated with the gear pump 100 through an accessory gearbox 14. A main shaft 13 is connected to an accessory gearbox 14. The accessory gearbox 14 is connected to gear pump 100 through a pump drive shaft 15. The gear pump 100 is operatively associated with a fluid distribution system (e.g., fuel system 20) for receiving input fluid at a first pressure and supplying the input fluid at a second pressure, the second pressure being greater than the first pressure. In the illustrated embodiment of FIG. 1, the fluid distribution system is a fuel system 20 and the gear pump 100 may be a high pressure fuel pump in the fuel system 20. It is understood that while a fuel system 20 is utilized for exemplary illustration, embodiments disclosed herein may be applied to other fluid distribution system requiring a gear pump such as, for example, a hydraulic system, a fueldraulic system, a lubrication system, or any other suitable fluid distribution system known to one of skill in the art.

The fuel system 20 may include a fuel supply line 22 that may flow liquid fuel from a fuel tank 24 to fuel nozzles 26 of an engine (not shown). A fuel bypass line 28 may be arranged to divert fuel from the supply line 22 and back to the fuel tank 24. Various fuel system components may interpose the fuel supply line 22 and may include a low pressure fuel pump 30, a heat exchanger 32, a fuel filter 34, the gear pump 100, a metering valve 38, a high pressure fuel shutoff valve 40, a screen 42, a fuel flow sensor 44, a fuel bypass line bypass valve 45, and a fuel tank shutoff valve 46. The low pressure fuel pump 30 may be located downstream of the fuel tank 24 and of the fuel tank shutoff valve 46. The heat exchanger 32 may be located downstream of the low pressure fuel pump 30. The fuel filter 34 may be located downstream of the heat exchanger 32. The gear pump 100 may be located downstream of the fuel filter 34 and upstream of the fuel bypass line 28. The metering valve 38 may be located downstream from the bypass line 28. The high pressure fuel shutoff valve 40 may be located downstream from the bypass line 28. The screen 42 may be located downstream from the high pressure fuel shutoff valve 40, and the fuel flow sensor 44 may be located downstream from the screen 42. It is further contemplated and understood that other component configurations of a fuel system are applicable and may further include additional sensors, valves, lines, and other components.

Figure 2:
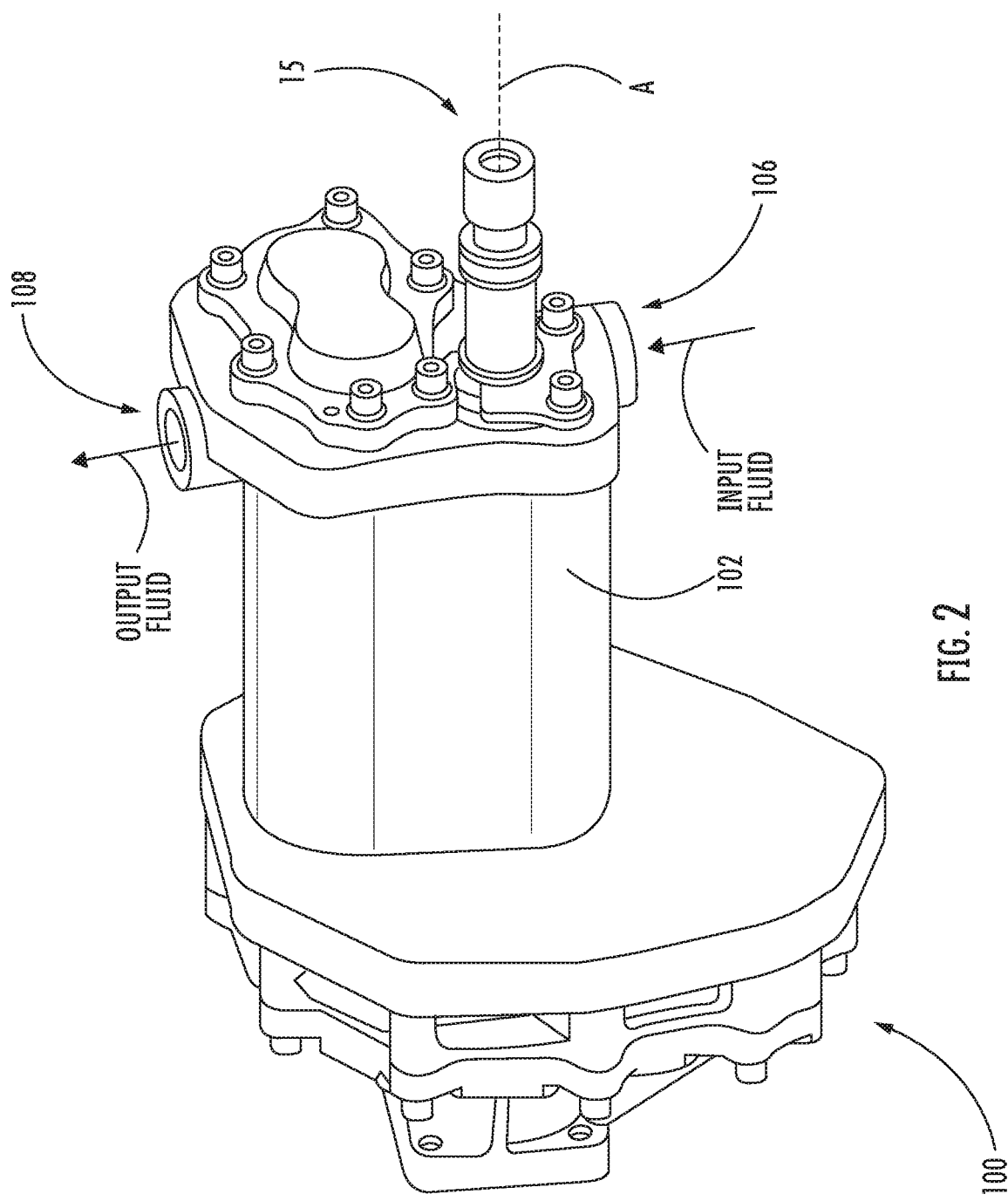
FIG. 2 illustrates a perspective view of the gear pump of FIG. 1, showing a pump housing, inlet, and outlet.

Referring to FIG. 2, an exterior of the gear pump 100 is shown. The gear pump 100 includes a housing 102. The housing 102 receives a pump drive shaft 15 and defines a fluid inlet 106 and a fluid outlet 108. Rotation of the pump drive shaft 15 drives the drive gear, which, in turn drives the driven gear (shown in FIG. 3) disposed within the housing 102 such that fluid entering the fluid inlet 106 is pressurized and provided at the fluid outlet 108.

Figure 3:
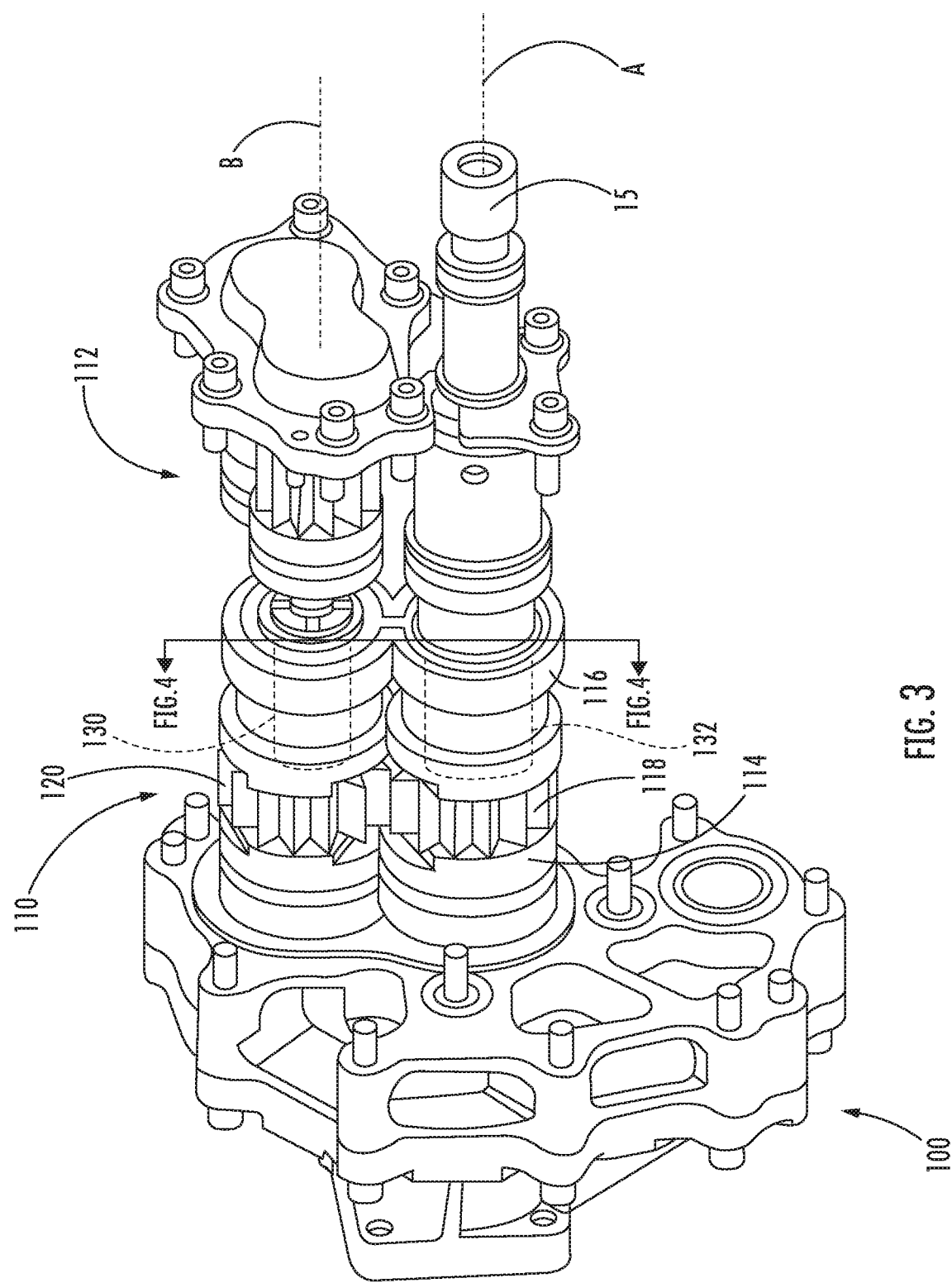
FIG. 3 is a perspective view of the gear pump of FIG. 1, showing opposed bearing carriers having seated therein first and second shafts with respective drive and driven gears.

Referring to FIG. 3, an interior of the gear pump 100 is shown. The gear pump 100 includes a first stage 110 and a second stage 112 serially arranged in relation to one another along a first rotation axis A and a second rotation axis B. The first stage 110 includes a first bearing carrier 114, a second bearing carrier 116, a first gear 120, and a second gear 118. The first bearing carrier 114 defines a first shaft-receiving aperture 122 (shown in FIG. 4) and a second shaft-receiving aperture 124 (shown in FIG. 4). The first gear 120 is fixed to a first shaft 130 and extends along rotation axis B as an assembly. The first shaft 130 is rotatably supported in both the first shaft-receiving aperture 122 and the first shaft-receiving aperture 126 (shown in FIG. 5). The second gear 118 is fixed to the second shaft 132 and extends along a rotation axis A. The second shaft 132 is rotatably supported in both a second shaft-receiving aperture 124 and a second shaft-receiving aperture 128 (shown in FIG. 5) such that the second shaft 132 is parallel with a first shaft 130 and teeth of the first gear 120 are intermeshed with teeth of the second gear 118.

A pump drive shaft 15 is coupled to the second shaft 132 for rotating the second shaft 132. Rotation of the second shaft 132 rotates the second gear 118. As the second gear 118 rotates, teeth of the second gear 118 intermesh and rotate with teeth of the first gear 120. This pumps fluid disposed between teeth of the second gear 118, i.e. the drive gear, and first gear 120, i.e. the driven gear, as described in U.S. patent application Ser. No. 13/614,173, filed Sep. 13, 2012, the contents of which are incorporated herein in their entirety.

Figure 4:
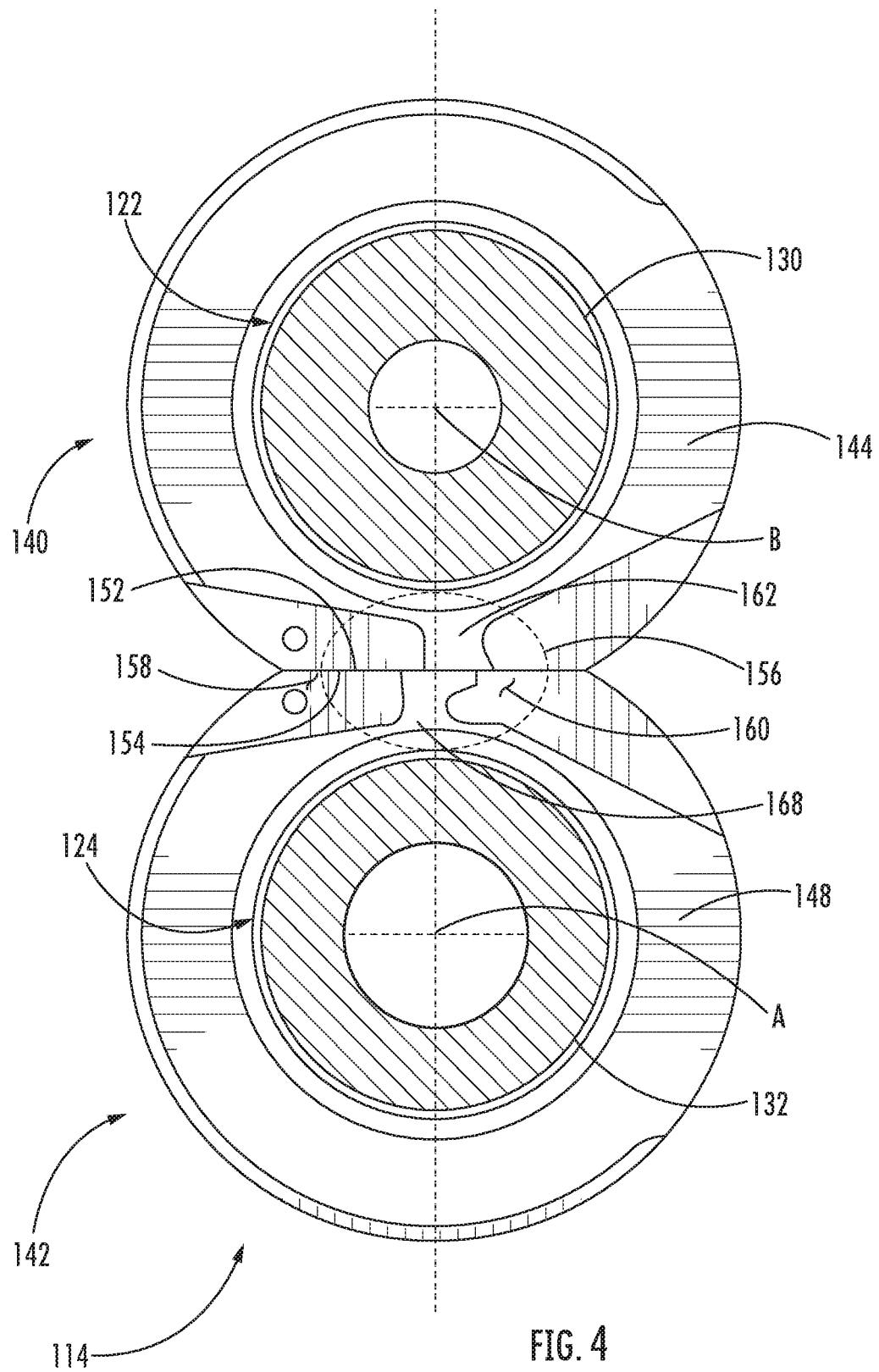
FIG. 4 is an end view of one of the bearing carriers of the gear pump of FIG. 1, showing shaft apertures and a bridge land defined by the exterior surface of the bearing carrier.

Referring to FIG. 4, a first bearing carrier 114 is shown. The first bearing carrier 114 is a cast body formed from a copper alloy, such as brass, bronze or other suitable material, and includes a first bearing body 140 and a second bearing body 142. The first bearing body 140 and the second bearing body 142 may be adjacent to one another or integrally joined to one another in a structure having a 'FIG. 8' axial profile, i.e. when viewed along rotation axis A or rotation axis B. A bearing face 144 of the first bearing body 140 defines a first shaft-receiving aperture 122 and mates to an axial end face of the second bearing carrier 116 (shown in FIG. 3). The first shaft 130 is rotatably supported within the first shaft-receiving aperture 126 (shown in FIG. 5). A bearing face 148 of the second bearing body 142 defines a second shaft-receiving aperture 124 and mates to a corresponding axial end of second bearing carrier 116 (shown in FIG. 3). The second shaft 132 is rotatably supported with the second shaft-receiving aperture 124.

The first bearing body 140 defines an edge 152 that is adjacent to an edge 154 of the second bearing body 142. The first bearing body 140 and the second bearing body 142 define a bridge land 156 (circled with dashed lines in FIG. 4). The bridge land 156 is adjacent of the edge 152 and the edge 154. The bridge land 156 facilitates fluid interchange at the gear mesh. The bridge land 156 includes an inlet channel 158 and an outlet channel 160 defined by adjacent portions of the first bearing body 140 and the second bearing body 142. A finger 162 of the first bearing body 140 and a finger 168 of the second bearing body 142 separate the inlet channel 158 from the outlet channel 160. As the first gear 120 (shown in FIG. 3) and the second gear 118 (shown in FIG. 3) rotate, fluid is drawn from the inlet channel 158 at a first pressure and into the outlet channel 160 at a second pressure, the second pressure being higher than the first pressure.

The bearing face 144 of the first bearing body 140 is in a facing spaced relationship with the first gear 120. The space between the bearing face 144 and the first gear 120 is minute or small enough such that fluid is prevented from leaking between the bearing face 144 and the first gear 120 from the inlet channel 158 to the outlet channel 160. The space between the bearing face 144 and the first gear 120 is about equal to 0 inches (0 mm) during start at low cranking speed until fluid pressure and speed increase resulting in a fluid film less than 0.001 inches (0.0254 mm) during operation (i.e., the space may increase to less than about 0.001 inches (0.0254 mm) during operation). Debris within the fluid may become lodged in between the bearing face 144 and the first gear 120, subsequently etching a wear groove 173 (See FIGS. 7, 7A, and 7B) into the bearing face 144.

The bearing face 148 of the second bearing body 142 is in a facing spaced relationship with the second gear 118. The space between the bearing face 148 and the second gear 118 is minute or small enough such that fluid is prevented from leaking between the bearing face 148 and the second gear 118 from the inlet channel 158 to the outlet channel 160. The space between the bearing face 148 and the second gear 118 is about equal to 0 inches (0 mm) during start at low cranking speed until fluid pressure and speed increase resulting in a film less than 0.001 inches (0.0254 mm) during operation (i.e., the space may increase to less than about 0.01 inches (0.0254 mm) during operation). Debris within the fluid may become lodged in between the bearing face 148 and the second gear 118, subsequently etching a wear groove 173 (See FIGS. 7, 7A, and 7B) into the bearing face 148.

Figure 5:
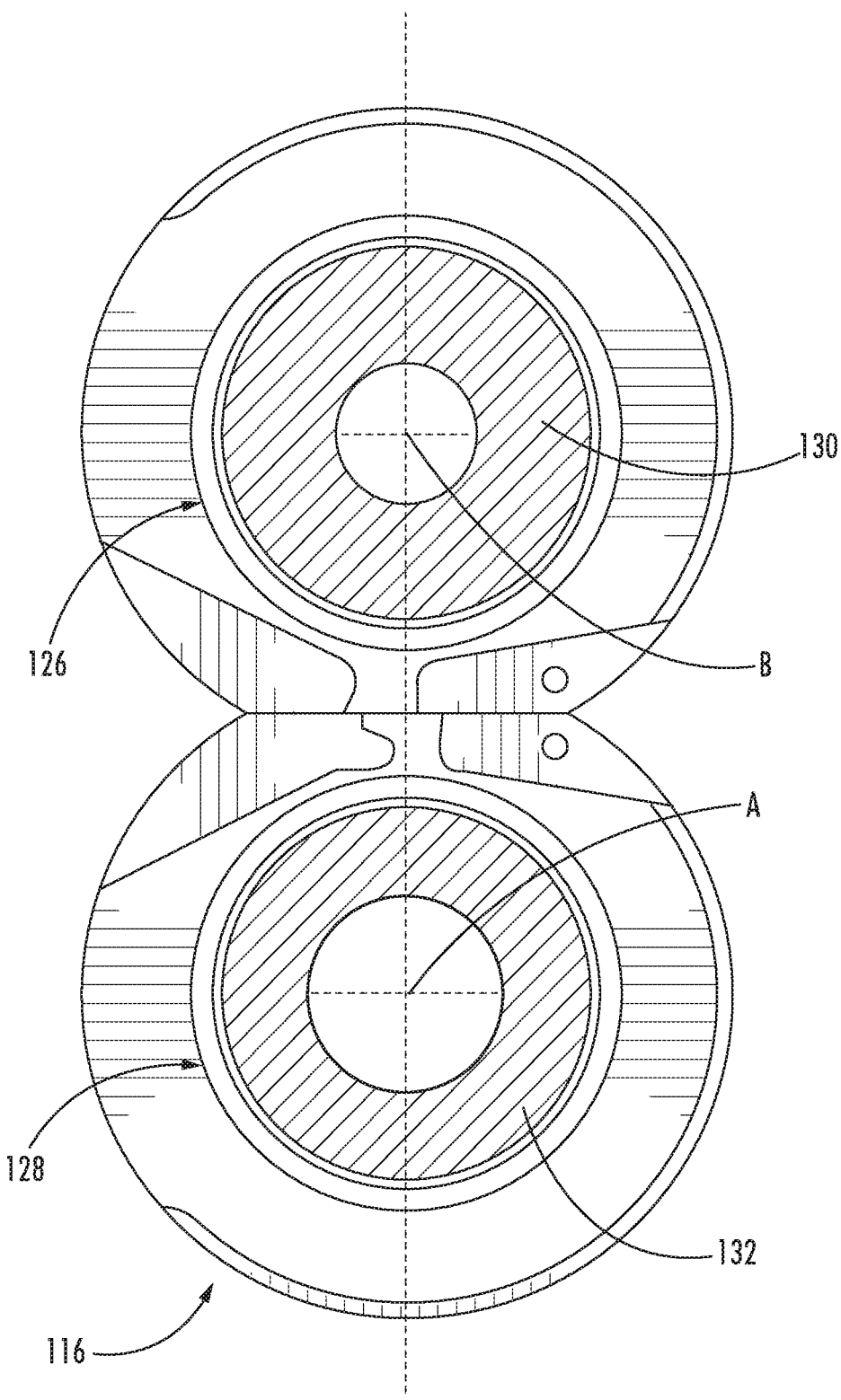
FIG. 5 is an end view of another of the bearing carriers of the gear pump of FIG. 1, showing shaft apertures and a bridge land defined by the exterior surface of the bearing carrier.

Referring to FIG. 5, a second bearing carrier 116 is shown. The second bearing carrier 116 is similar to the first bearing carrier 114, and additionally includes a surface contour that mirrors the surface contour of the first bearing carrier 114. The second bearing carrier 116 defines shaft-receiving apertures, a first shaft-receiving aperture 126 of the second bearing carrier 116 facing the first shaft-receiving aperture 122 (shown in FIG. 4) of the first bearing carrier 114, and a second shaft-receiving aperture 128 of the second bearing carrier 116 facing the second shaft-receiving aperture 124 (shown in FIG. 4) of the first bearing carrier 114.

Referring to FIGS. 6, 7, 7A, and 7B, a portion of the first bearing carrier 114 is shown. First bearing carrier 114 includes a first material 170 and a second material 172. Second material 172 is integrally coupled to first material 170 and may be cladded to first material 170. The second material 172 is located at the bearing face 144 and may form the bearing face 144 and/or a portion of the bearing face 144. In an embodiment, the second material 172 covers the entire bearing face 144 excluding the bridge land 156. The first material 170 is a cast copper alloy, such as brass or bronze. Second material 172 may also be a copper alloy, of improved wear characteristics or a material such as steel.

In embodiments, the second material 172 may be a different material from the first material 170. For example, in certain embodiments, the second material 172 has a greater ultimate stress or yield stress than the first material 170. The second material 172 may have a greater thermal coefficient of expansion or melting point than first material 170. A density of the second material 172 can be greater than or less than a density of the first material 170. Examples of materials included in the second material 172 are aluminum and aluminum alloys, monel, carbon steels, stainless steels, nickel alloys, and titanium or titanium alloy. It is noted that monel can provide substantially the same coefficient of thermal expansion and density as the copper alloy forming first material 170 while providing improved mechanical stress.

At least one of the first material 170 and the second material 172 define a portion of the bearing face 144 of the bearing body 140 extending about the shaft-receiving aperture 122 (shown in FIG. 4). In an embodiment, the portion of the bearing face 144 excludes the bridge land 156. In accordance with certain embodiments, the second material 172 can be cladded to the first material 170, such as through a laser cladding process as show in FIG. 6. In accordance with other embodiments, the second material 172 may fill the wear groove 173 of the bearing face 144 as a sleeve insert 171 rather than covering the second face 144 of the first bearing carrier 114, as seen in FIGS. 7, 7A, and 7B. In an embodiment, the sleeve insert 171 may be formed separately using the second material 172 and then secured within the wear groove 173 of the bearing face 144. In another embodiment, the sleeve insert 171 may be formed by laser cladding the second material 172 to the wear groove 173 of the first material 170. The second material 172 of the sleeve insert 171 may be defined (e.g., sculpted) to the near-net shape (i.e., final dimensions) of the bearing face 144 through additive manufacturing and/or subtractive manufacturing.

In an embodiment the sleeve insert 171 may include one or more dowel pins 174 projecting outward from the second material 172 of the sleeve insert 171 and into the first material 170 of the bearing body 140 (shown in FIG. 4) of the first bearing carrier 114. The one or more dowel pins 174 may be composed of the second material 172 or a material different from the second material 172. The one or more dowel pins 174 may be formed concurrently with the sleeve insert 171 and/or securely attached to the sleeve insert 171. The one or more dowel pins 174 may be pressed into the sleeve insert 171. The dowel pins 174 can be manufactured together with the sleeve insert 171 using Advanced Additive Manufacturing (AAM) methods. Alternatively, the dowel pins 174 can be cast together with the sleeve insert 171 as "one" unit using conventional casting methods. Alternatively, the dowel pins 174 can be cold drawn through a die thus forming one unit with the sleeve insert 171. Alternatively, the dowel pins 174 can be welded to the insert sleeve 171. Alternatively, the dowel pins 174 can be manufactured separately from the sleeve insert 171 and then can be attached to the sleeve insert via welding, brazing, soldering (if applicable), fusing, cold-pressing, etc. A single unit consisting of dowel pins 174 and the sleeve insert 171, can be cold-pressed into the bearing face 144, or welded, or fused, etc.

Advantageously, the addition of one or more dowel pins 174 to the sleeve insert 171 helps maintain the position of the sleeve insert 171 within the wear groove 173 and prevents the sleeve insert 171 from rotating within the wear groove 173. The sleeve insert 171 may also be held with an interference fit. It is understood that while the first bearing body 140 is utilized for exemplary illustration, embodiments disclosed herein may be applied to other bearing bodies including but not limited to the second bearing body 142.

The first material 170 can include a copper alloy, e.g. brass or bronze, and the second material 172 can include monel, steel, or titanium. The steel can be a stainless steel, carbon steel, or other suitable steel alloy material. In an embodiment, the second material has substantially the same density and thermal coefficient of expansion as the first material, and has superior mechanical properties including erosion resistance. It is contemplated that the second material 172 can have a galvanic potential that is similar than a galvanic potential of first material 170, e.g. the galvanic potential of second material 172 being within about 0 to 0.4 volts of first material 170. This can reduce or eliminate galvanic corrosion that could potentially develop between first and second material under certain conditions.

In embodiments, bearing carriers having a second material integrally coupled to a first material can provide a robust, relatively compact, lightweight additive insert to the bearing face of the main drive gear bearings. In certain embodiments, fuel gear pumps incorporating such bearing carriers can provide improved fuel pump operability in aircraft fuel systems, operability, and safety. This will reduce deterioration of the gears, bearings, housings, and other system components, thus maintaining pump and system performance and increasing component operating life.

Figure 8:
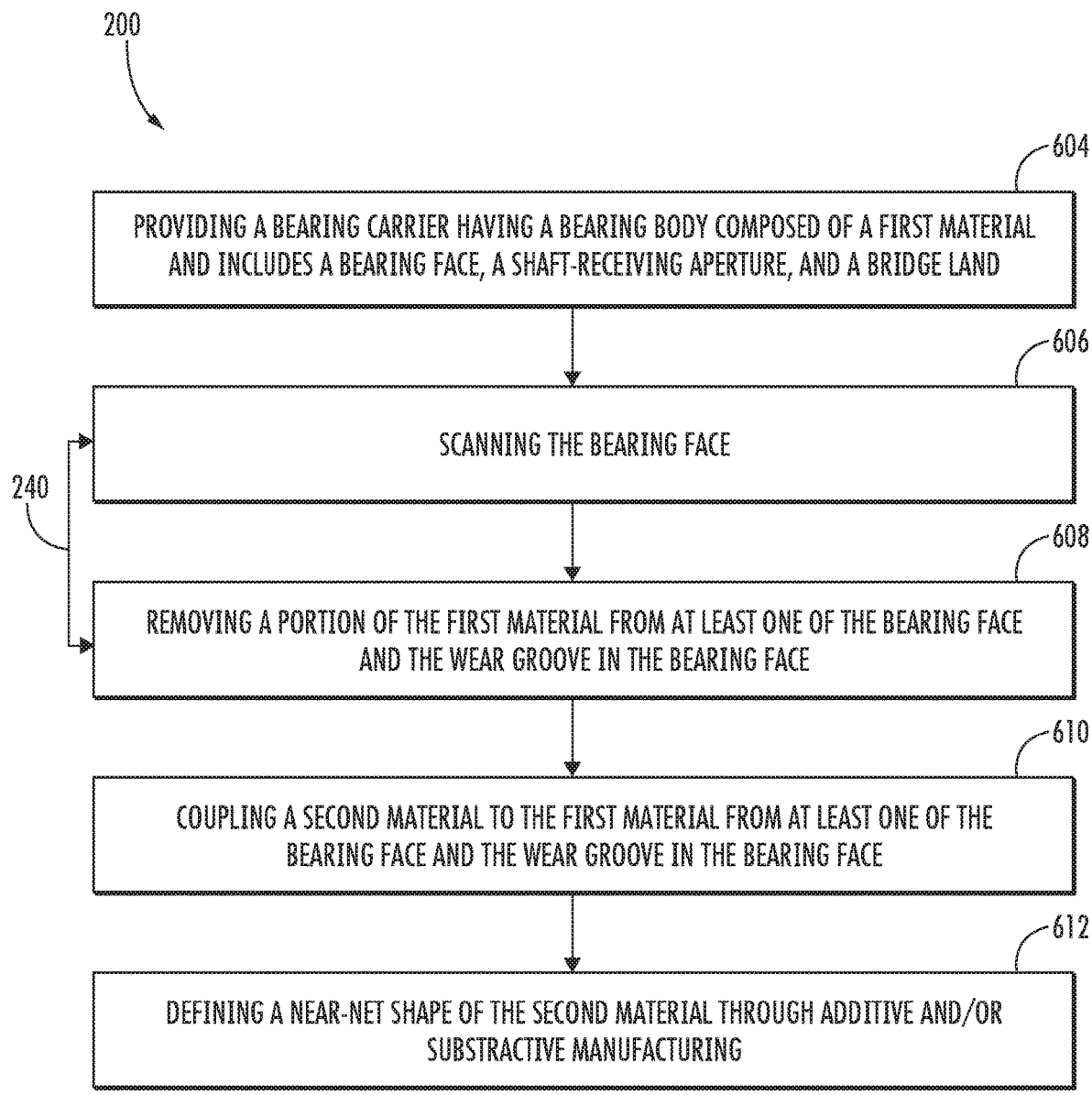
FIG. 8 is a diagram of a method of making a bearing carrier, showing operations of the method, according to an embodiment of the present disclosure.

Referring now to FIG. 8, a method 200 of fabricating a bearing carrier (e.g., first bearing carrier 114) is shown. At block 604, the method 200 includes providing a bearing carrier having a bearing body composed of a first material and including: a bearing face, a shaft-receiving aperture, and a bridge land (e.g., bridge land 156) with a finger cut to channel fluid pressurized by intermeshing of gears rotatably supported by the bearing carrier into an outlet defined by a housing enveloping the bearing carrier. The first material can be a copper alloy such as brass or bronze, and can be a cast body, and can include native material from a new bearing carrier or from a bearing carrier previously used in a pump assembly. The method 200 may optionally include the steps of block 606 and 608. At block 606, the method 200 may include scanning the bearing face. The scanning process can provide information for determining how much of the first material needs be removed from bearing face of the bearing carrier. It can also be for purposes of determining how much of a second material (e.g., second material 172) needs be added to the bearing face of bearing carrier. The scanning process may also focus on the wear groove (e.g., wear groove 173). The scanning process can provide information for determining the location and size of the wear groove. The scanning process can provide information for determining how much of the first material needs be removed from the wear groove. It can also be for purposes of determining how much of a second material need be added to the wear groove. As mentioned above, the second material may be coupled to a portion of the bearing face and/or the wear groove of the bearing face. As indicated with arrow 240, the scanning process between block 606 and block 608 can be iterative.

At block 608, the method 200 may also include removing a portion of the first material from at least one of the bearing face and the wear groove in the bearing face. This can expose a native portion of the first material that may more readily integrate with the second material. At block 610, the method 200 further includes coupling a second material to the first material of at least one of the bearing face and the wear groove in the bearing face. The coupling process may include at least one of a laser cladding process and an advanced additive manufacturing process to form a near-net shape (i.e., final dimensions of the bearing face of the bearing body). The near-net shape formed can closely, though not necessarily precisely, resemble the intended final dimensions of the bearing face of the bearing body. At block 612, the method 200 may further include defining a near-net shape of the second material through additional additive and/or subtractive manufacturing.

Although particular operation sequences are shown, described, and claimed, it should be understood that operations may be performed in any order, separated or combined unless otherwise indicated and will still benefit from the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing carrier, comprising:
   a bearing body of a first material having a shaft-receiving aperture and a bridge land with a finger cut to channel fluid pressurized by intermeshing of gears rotatably supported by the bearing carrier into an outlet defined by a housing enveloping the bearing carrier,
   wherein the bearing body includes a bearing face configured to be in a facing spaced relationship with the gears,
   wherein the bearing face includes a wear groove and a second material integral with the first material, the second material being located within the wear groove,
   wherein the wear groove extends completely around the shaft-receiving aperture,
   wherein the second material defines a portion of the bearing face of the bearing body extending about the shaft-receiving aperture, the portion of the bearing face excluding the bridge land.

2. The bearing carrier as recited in claim 1, wherein the second material is formed through at least one of laser cladding and advanced additive manufacturing.

3. The bearing carrier as recited in claim 1, wherein the second material located within the wear groove is formed outside of the wear groove and then secured within the wear groove.

4. The bearing carrier as recited in claim 1, wherein the second material further includes one or more dowel pins projecting outward from the second material and into the first material of the bearing body.

5. The bearing carrier as recited in claim 4, wherein the one or more dowel pins are composed of the second material.

6. The bearing carrier as recited in claim 4, wherein the one or more dowel pins are composed of a material different from the second material.

7. The bearing carrier as recited in claim 1, wherein the first material is different from the second material.

8. The bearing carrier as recited in claim 1, wherein the second material has a greater ultimate stress than an ultimate stress of the first material.

9. The bearing carrier as recited in claim 1, wherein the second material has a greater yield stress than a yield stress of the first material.

10. The bearing carrier as recited in claim 1, wherein the second material has a thermal coefficient of expansion that is less than a thermal coefficient of expansion of the first material.

11. The bearing carrier as recited in claim 1, wherein the second material is press fit into the first material.

12. The bearing carrier as recited in claim 1, wherein the second material has a melting point that is greater than a melting point of the first material.

13. The bearing carrier as recited in claim 1, wherein a density of the second material is less than a density of the first material.

14. The bearing carrier as recited in claim 1, wherein a galvanic potential of the second material is similar to a galvanic potential of the first material.

15. The bearing carrier as recited in claim 1, wherein the first material comprises a copper alloy and the second material comprises monel, nickel, steel, or titanium.

16. The bearing carrier as recited in claim 1, wherein the second material is cladded to the first material.

17. A pump, comprising:
    a bearing body of a first material having a shaft-receiving aperture and a bridge land with a finger cut to channel fluid pressurized by intermeshing of gears rotatably supported by a bearing carrier into an outlet defined by a housing enveloping the bearing carrier,
    wherein the bearing body includes a bearing face in a facing spaced relationship with the gears,
    wherein the bearing face includes a wear groove and a second material integral with the first material, the second material being located within the wear groove,
    wherein the wear groove extends completely around the shaft-receiving aperture,
    wherein the second material defines a portion of the bearing face of the bearing body extending about the shaft-receiving aperture, the portion of the bearing face excluding the bridge land, and wherein the shaft-receiving aperture is a first shaft-receiving aperture and the bearing carrier defines a second shaft-receiving aperture;

a first shaft rotatably supported in the first shaft-receiving aperture;

a second shaft parallel with the first shaft and seated in the second shaft-receiving aperture;

a first gear mounted to the first shaft; and a second gear mounted to the second shaft and intermeshed with the first gear, wherein the bridge land of the bearing body faces the intermeshed gears such that intermeshing of the gears pressurizes and drives fluid across the bridge land and across channels defined in an exterior surface of the bearing carrier.

18. A method of fabricating a bearing carrier having a bearing body composed of a first material, the bearing body including a bearing face, a shaft-receiving aperture, and a bridge land with a finger cut to channel fluid pressurized by intermeshing of gears rotatably supported by the bearing carrier into an outlet defined by a housing enveloping the bearing carrier, wherein the method comprises:

coupling a second material to a portion of the bearing face of the bearing body, the portion of the bearing face of the bearing body extending about the shaft-receiving aperture, wherein the portion of the bearing face excludes the bridge land; and defining the portion of the bearing face of the bearing body to a final dimensional shape of the bearing face, wherein the bearing face includes a wear groove, the second material being located within the wear groove, wherein the wear groove extends completely around the shaft-receiving aperture.

19. The method as recited in claim 18, wherein the second material is coupled to the first material using at least one of a laser cladding process and an advanced additive manufacturing process.

* * * * *